United States Patent [19]

Sotiroff et al.

[11] Patent Number: 5,852,810

[45] Date of Patent: Dec. 22, 1998

[54] GEOGRAPHIC SPECIFIC INFORMATION SEARCH SYSTEM AND METHOD

[75] Inventors: James P. Sotiroff, Whitmore Lake; Gerald W. Walden, Ypsilanti, both of Mich.

[73] Assignee: Student Housing Network, Ann Arbor, Mich.

[21] Appl. No.: 591,927

[22] Filed: Jan. 29, 1996

[51] Int. Cl.[6] .................................................. G06F 17/60
[52] U.S. Cl. .......................... 705/27; 705/26; 345/326; 345/339; 345/353; 707/10
[58] Field of Search .................................. 705/1, 26, 27, 705/35, 37, 5, 6; 707/1, 2, 3, 4, 5, 7, 10, 104; 345/326, 329, 339, 340, 349, 352, 353, 355

[56] References Cited

U.S. PATENT DOCUMENTS

| | | |
|---|---|---|
| 4,870,576 | 9/1989 | Tornetta . |
| 5,032,989 | 7/1991 | Tornetta . |
| 5,179,652 | 1/1993 | Rozmanith et al. . |
| 5,185,857 | 2/1993 | Rozmanith et al. . |
| 5,283,731 | 2/1994 | Lalonde et al. ............................. 705/1 |
| 5,325,297 | 6/1994 | Bird et al. . |
| 5,335,323 | 8/1994 | Kolnick . |
| 5,371,845 | 12/1994 | Newell et al. . |
| 5,532,838 | 7/1996 | Barbari .................................... 358/400 |
| 5,664,115 | 9/1997 | Fraser ....................................... 705/37 |
| 5,721,851 | 2/1998 | Cline et al. ............................. 345/349 |

*Primary Examiner*—Stephen Tkacs
*Attorney, Agent, or Firm*—Harness, Dickey & Pierce, P.L.C.

[57] ABSTRACT

A geographic-specific information search system and method comprising a World Wide Web home page and associated script files for searching for housing information in a desired geographic region. The system is configured to display a graphical map and to allow the user to narrow the geographic search area to the desired region. The system is also configured to accept a query criteria and search a database containing property listings for properties listed in the desired region meeting the entered search criteria. A geographic map of the desired region including properties found during the search is displayed and the user is allowed to select properties from the map with a pointing device and subsequently view information describing the selected properties.

23 Claims, 8 Drawing Sheets

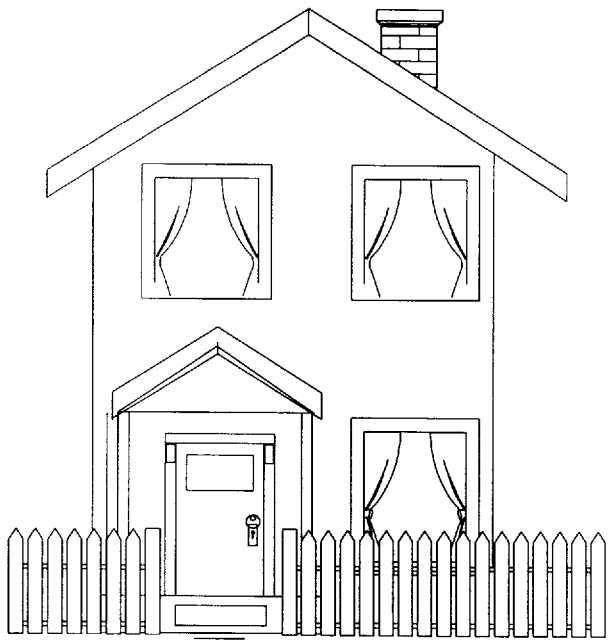

*114 E. Kingsley*

*A cozy house right in the heart of kerrytown, with an old fashioned front porch for those warm summer nights*

*4 to 5 bedroom house with basement*

*Newly renovated*

*Washer/Dryer included*
*All Appliances*
*Windows blinds throughout*
*Plenty of parking*
*Large bedrooms*
*Many windows throughout*
*12 month installment lease*
*Best suited for groups of 5-8*
*We specialize in Student Housing and WE WANT YOU TO BE OUR RESIDENT*
*Call today for a private showing*

*Fig-5*

GEOGRAPHIC SPECIFIC INFORMATION SEARCH SYSTEM AND METHOD

FIELD OF THE INVENTION

The present invention relates to search systems and methods for geographic specific information. More particularly, the present invention relates to computer software and systems for listing and locating housing in specific geographic regions.

BACKGROUND OF THE INVENTION

When moving to a new city or location, one of the most difficult tasks confronting the person or family moving is finding desirable housing. This problem is particularly relevant for college students who often times live a great distance from where they attend school. Furthermore, often times college students must do without automobiles and must therefore find housing in very specific on or near campus areas. Apartment search professionals are generally available in most locations, however, difficulties often arise in accurately describing the type and location of housing desired. Furthermore, viewing and applying for housing can often be difficult when moving from a location remote from the desired area. It is also difficult to determine exactly where available apartments are located with respect to desired locations and/or landmarks.

Other methods for locating available housing include reviewing the "Want" ads of a local paper or local bulletin board or actually making a personal trip to the desired location to personally search in desired areas. However, these methods are often expensive and time consuming and do not solve any of the problems discussed above.

A large part of lessors and property managers duties entail advertising and showing available housing. It is especially important for lessors and property managers to keep advertisements and listings current as the availability status of the properties change. This is especially difficult since most daily newspapers require several days advance notice for placing and/or changing advertisements. It is also very time consuming for property managers to take applicants on "walk throughs". The property manager must make an appointment to meet the applicant at a time convenient for both the applicant and property manager, as well as travel to the apartment to conduct the "walk through".

With the increasing power of the personal computer and computer equipment, the Internet, particularly the World Wide Web, has become a very valuable resource of information. It is commonplace for college students to have university accounts which provide access to the Internet as part of the students tuition. Furthermore, businesses have been coming "on-line" with increasing interest, exploring the commercial aspects of the Internet.

Thus, there is a need for an improved system and method of finding geographic specific information, such as housing available in a specific geographic area. There is also a need for an improved system and method of updating the status of housing listings in an efficient and timely manner. There is a further need for an improved system and method for showing and seeing available housing.

SUMMARY OF THE INVENTION

The present invention provides a geographic specific information search system and method wherein the user narrows searches to specific geographic areas by selecting, on graphical maps, specific areas of interest. A series of interactive graphical maps are recursively selected and displayed to narrow the geographic search to individual pieces of information at specified locations. The user can view the individual pieces of information and form requests for additional information which are forwarded to the information supplier for response.

One object of the present invention is to provide an improved system and method of finding geographic specific information, such as housing available in a specific geographic area Another object of the present invention is to provide an improved system and method of updating the status of housing listings in an efficient and timely manner.

Still another object of the present invention is to provide an improved system and method for showing and seeing available housing.

In order to achieve the foregoing objects, the present invention provides a World Wide Web home page and associated scripts as well as an information database for displaying and searching housing information by geographic area. The user accesses the web page through the Internet using any standard Internet browser. The geographic search region is defined by the user by selecting areas on a series of interactive graphical maps. The search region is narrowed to individual quadrants, wherein specific points of interest are displayed. Information describing the specific points of interest is held in a database and can be accessed by the user selecting the corresponding point on the displayed quadrant. The user is allowed to build a list of points of interest for which the user desires additional information and the list along with information about the user can be submitted for response. Appropriate property managers are automatically notified of a request for additional information and user information through Internet e-mail or other appropriate means and the property managers individually respond to each request.

The information database comprises a collection of data submitted by lessors and property managers listing available housing or other geographic specific information of interest to the systems users. The property managers are registered and given an ID and password which they can use to logon to the database portion of the system. The system verifies the property manager's ID and password and allows the property managers to access and edit database entries submitted earlier by the property manager. This allows the property manager an efficient and timely means for keeping information current. For property managers not having an Internet e-mail address or not wishing to receive requests for additional information via Internet e-mail, special property manager home pages may be established for holding the requests for additional information and other information for the property manager. The property manager is allowed access to their individual home pages through the use of the provided ID and password. The property manager is also allowed to insert new points of interest by selecting a specific area on a quadrant map and supplying information corresponding to the selected point. The new point of interest is then added to a quadrant map containing the previous points of interest and the point information is entered into the database for user retrieval later.

Each database entry can be configured to include information ranging from text describing the individual locations to digitized still and moving pictures of the locations. Through the use of this system, a user could locate housing available in very specific geographic areas. The user can select individual properties in each desired region and view specific information pertaining to each property such as apartment size, number of bedrooms or bathrooms, cost of leasing property, availability of apartments and other amenities. If available, the user can be presented with a digitized picture of the apartment building and/or individual rooms in certain apartments. Also if available, the user can request a digital "walk through" in which a digitized full motion video clip is shown which illustrates specific rooms and features of available properties.

Further objects, features and advantages of the present invention will become apparent from a consideration of the following description and the appended claims when taken in connection with the accompanying drawings.

BRIEF DESCRIPTION OF THE DRAWINGS

FIG. 5 is a pictoral screen view of a representation of a database record of the present invention including a digitized picture;

DETAILED DESCRIPTION OF THE PREFERRED EMBODIMENT

Figure 1:
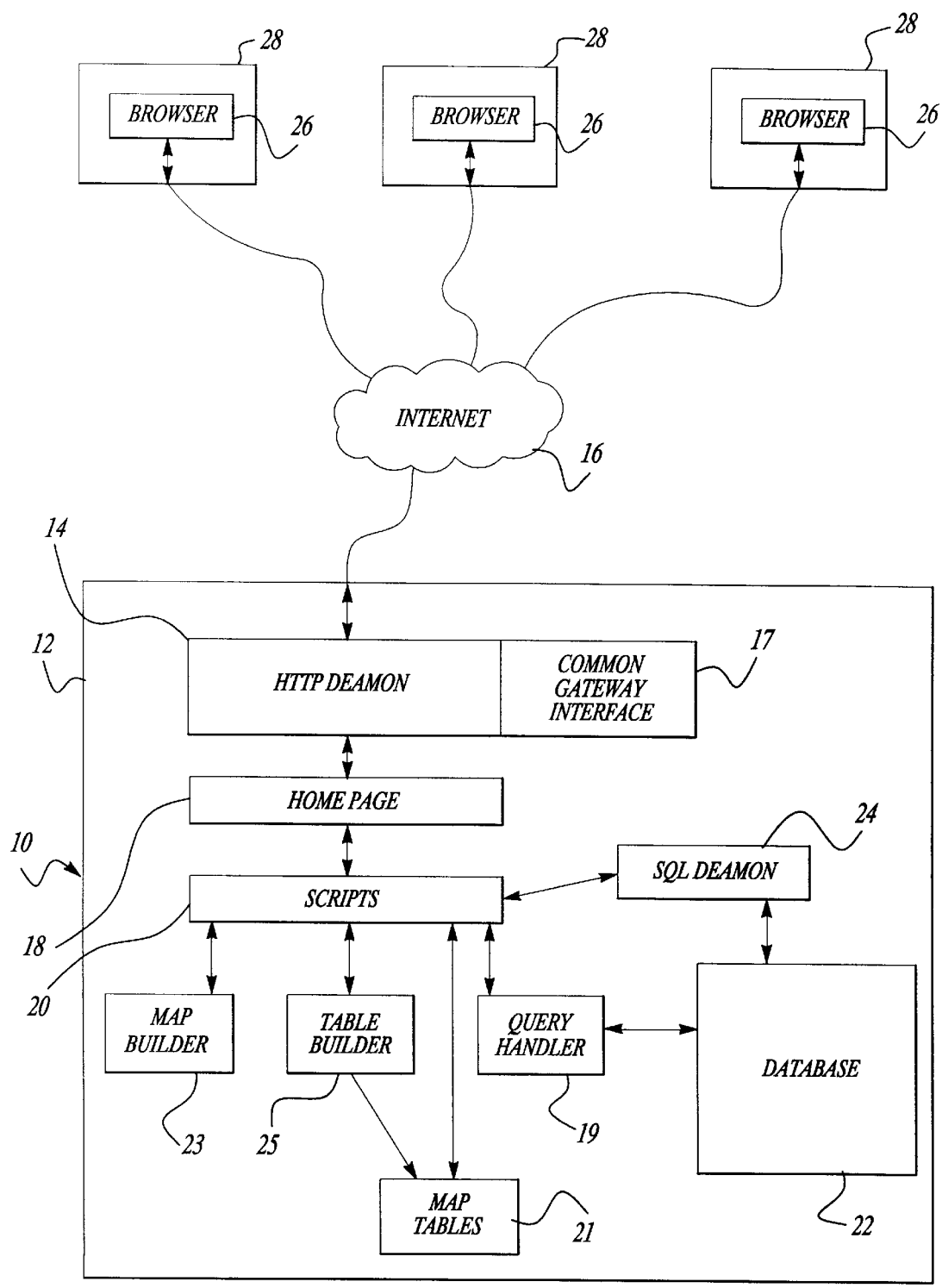
FIG. 1 is a schematic block diagram of the system of the present invention.

Preferred embodiments of the geographic specific information search system and method of the present invention are described herebelow with reference to the drawings.

Referring to FIGS. 1–5, the geographic specific information search system, indicated generally at 10, includes an Internet server 12, running an http deamon process 14. The http deamon process 14 provides an input/output interface and establishes and manages the server's connection to the Internet 16. The http deamon 14 also communicates with the home page 18, which provides the user interface into the search system 10. The home page 18 is written in Hyper-Text Markup Language (HTML) and communicates with a set of scripts 20 which provide additional processing and formulate specific database queries.

In the preferred embodiment, the database 22 is a Structured Query Language (SQL) database. An SQL deamon process 24, running on the server 12, manages the interface between the scripts 20 and the database 22 and is responsible for searching the database 22 for database records which meet certain search criteria. When appropriate records are found, they are forwarded to the home page 18 via the scripts 20.

A system user accesses the home page 18 through the Internet 16. The home page 18 can be accessed and viewed using any standard HTML browser 26 running on a remote machine 28. The browser 26 displays home page information forwarded from the system 12. The browser 26 also processes and forwards user instructions to the server 12 for execution. The user gains access to the home page 18 by specifying the home page unique address.

Figure 2:
FIG. 2 is a pictoral screen view of a high level graphic map of the present invention.
Figure 3:
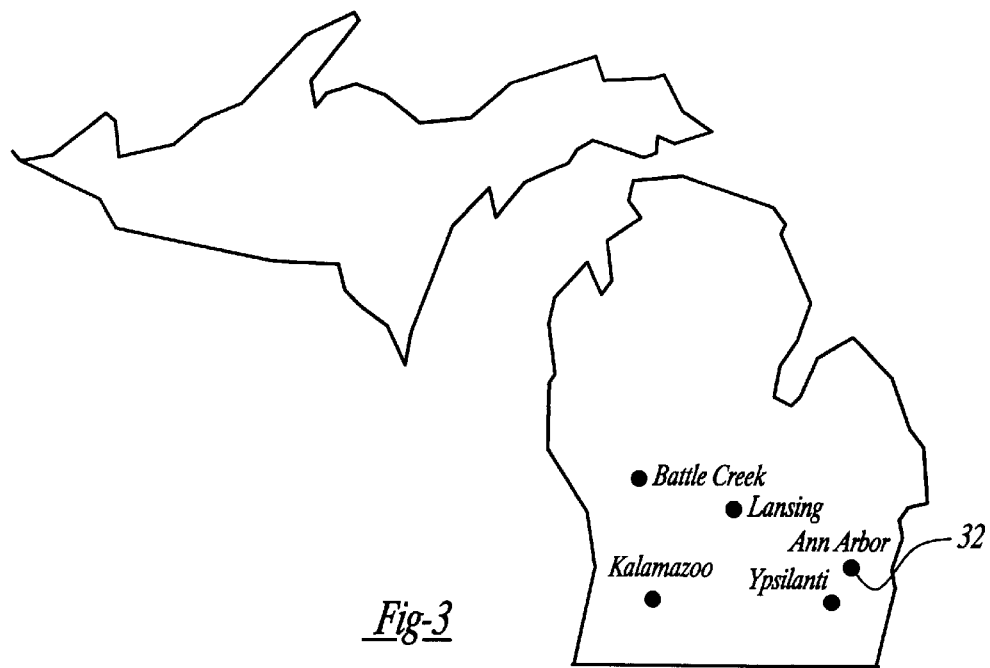
FIG. 3 is a pictoral screen view of a lower level graphic map of the present invention.
Figure 4:
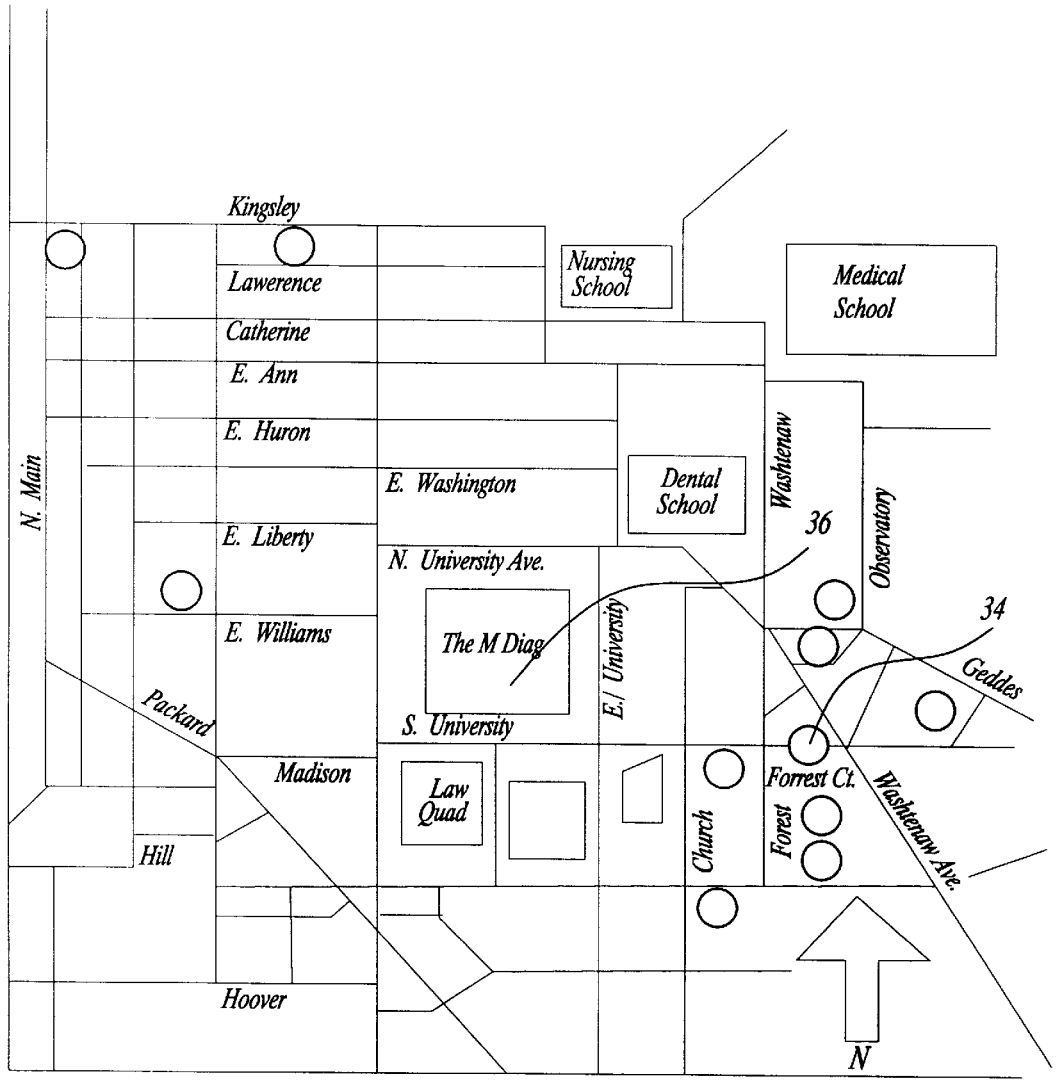
FIG. 4 is a pictoral screen view of a graphic quadrant map of the present invention.
Figure 6A:
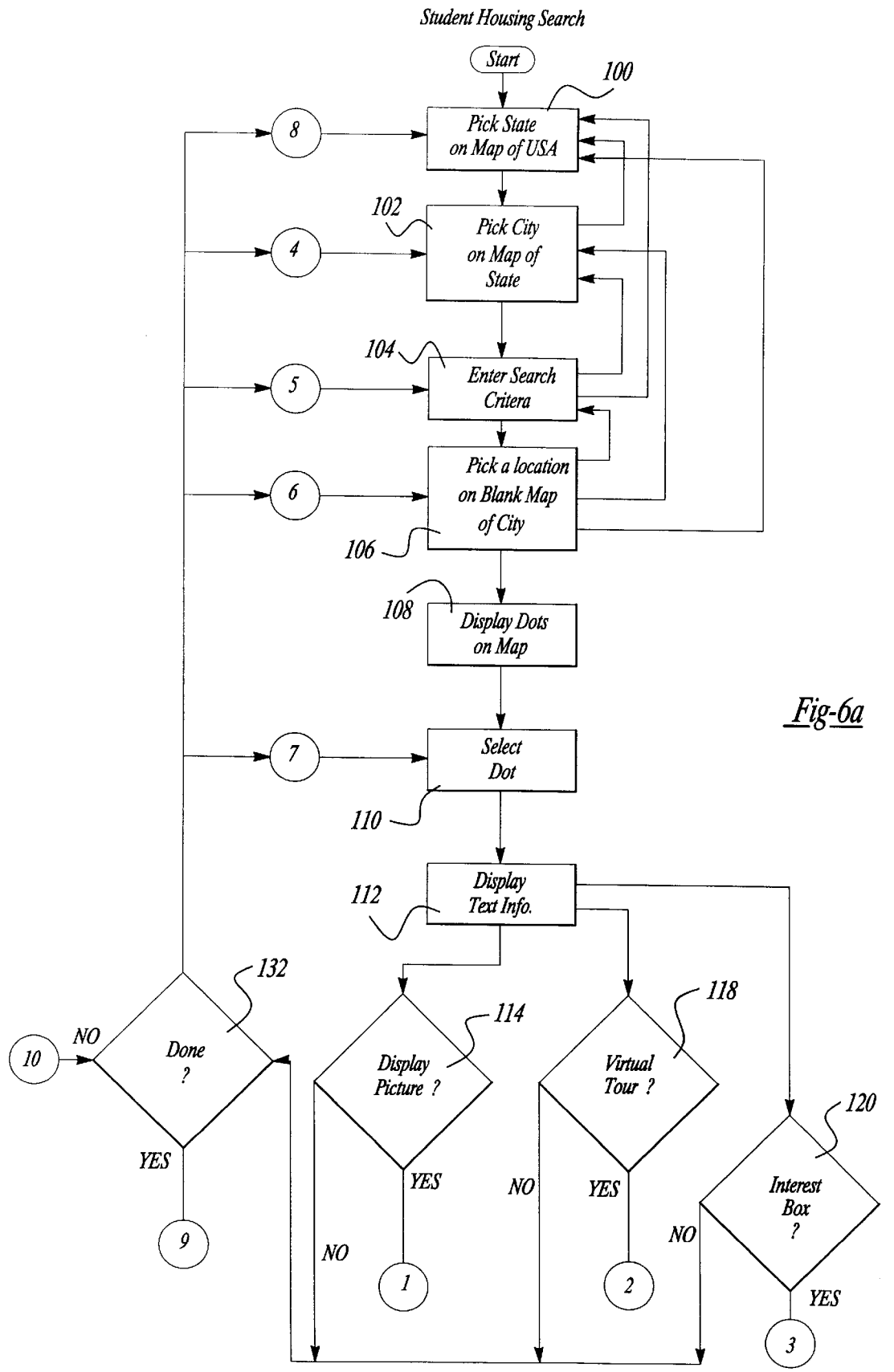
FIGS. 6a and 6b are a schematic flow chart diagram showing a method of searching for geographic specific information according to the present invention.
Figure 6B:
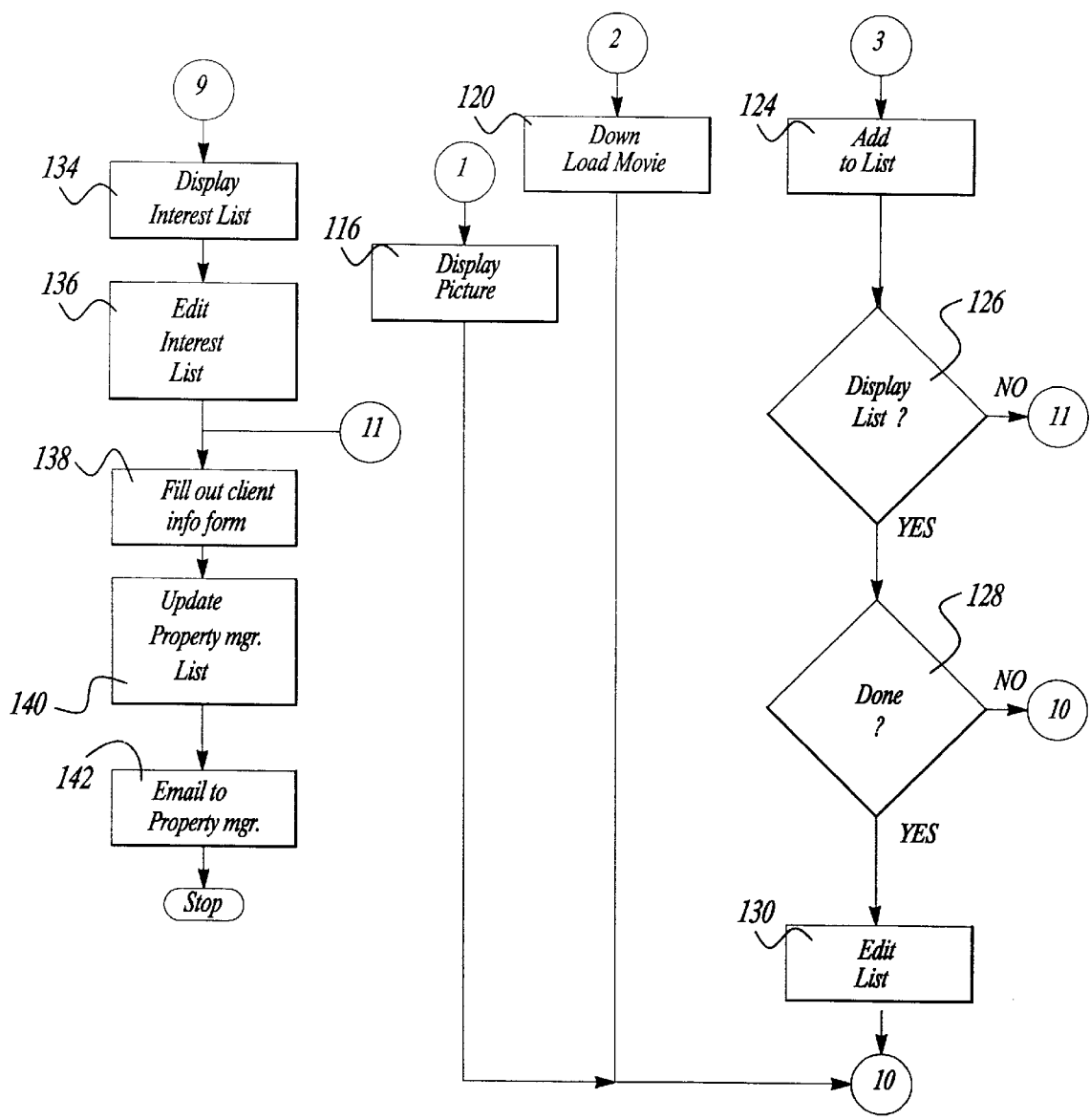

Once reached, the home page 18 provides operation options through a menu of "point and click" items. Referring to FIG. 6, upon selecting the option to query a database, the user is presented with a high level graphical map, as shown in FIG. 2, as a starting point for narrowing the geographic area of the search. The high level graphical map is designated by the home page 18 as an image map. The user is allowed to select a more specific area, in this case a particular state 30, from the high level map by moving a pointing device over the area and selecting the area (step 100, FIG. 6). Since the map is designated as an image map, the browser 26 returns the coordinates of the point selected on the map. The common gateway interface 17 of the http deamon recognizes the coordinates returned from the browser 26 and forwards the coordinates to the scripts 20. The scripts access a set of map tables 21 which contain information relating to blown up map images of areas of the high level map with coordinates on the high level map. From the map tables, a blown up lower level map of the selected area is determined and displayed, as shown in FIG. 3. The lower level map also has specific search regions highlighted, in this case specific cities of interest 32. The user is allowed to select a specific highlighted region again by moving a pointing device over the highlighted region and selecting the region (step 102) and the scripts identify the selected region using the map tables 21. After selecting a city from the state map, the user is prompted to enter a search criteria 104 including number of bedrooms desired, price range, etc.. A query handler 19 receives the search criteria and, together with the SQL deamon 24, accesses the database 22 returning property listings in the selected geographic region meeting the entered search criteria. After the search criteria is entered, a blank map of the selected city is displayed and the user is prompted to select an area of interest on the city map 106. A quadrant map of the selected area assembled by a map compiler 23 is then displayed, as shown in FIG. 4, containing highlighted points of interest 34, in this case locations corresponding to available housing 106. The map compiler 23 integrates the property listings returned from the database search into the quadrant map of the selected area at appropriate locations. Each database record includes not only property listing information but also the coordinates of the property on certain quadrant maps. Therefore, the map compiler 23 can determine where on the quadrant map to display the properties. A table builder 25 is configured to build a map table containing pointers to the property listings returned from the search as well as the coordinates of the properties on the quadrant map.

As shown in FIG. 4, the quadrant map relates points of interest 34 with landmarks 36 in the quadrant so as to give the user a view of where the points of interest 34 lie with respect to the landmarks. When a point of interest 34 is selected by a user (step 110), the home page 18 notifies the scripts 20 of the coordinates selected and the scripts 20 access the newly built map table to form and forward a database query to the SQL deamon 24 which searches the database 22 for the database record containing information relating to the selected point of interest 34. The information is forwarded by the SQL deamon 24 to the scripts 20 which format the information and forward it to the home page 18 for display (step 112). The displayed information can contain text and graphics 36, as shown in FIG. 5. On the display, the user is given the option to request a digitized picture of the property (step 114), which will be displayed by the home page 18 (step 116), request a digitized full motion video clip (step 118) which will be downloaded and displayed by the home page 18 (step 120) showing the point of interest in greater detail, or request the property be added to a list of properties of interest by selecting a check box for each property of interest (step 122). If the user requests the property be added to an interest list, the system 10 establishes the list and adds the property to the list (step 124). The user is then asked if he wants the system 10 to display the list (step 126). If the user decides to display the list, he is given the option to edit the list (steps 128 and 130). If the user declines, processing continues.

After the first search is completed, the user is allowed to conduct another search or exit the search procedure (step 132). If the user decides to end the search, the user is allowed to view (step 134) and edit (step 136) the interest list. The user is also prompted to complete a user information form (step 138) so that property managers for the selected properties can be notified of the user's interest so that the property managers can contact the user. After the user completes the user information form, the system updates the property manager notification lists (step 140) and sends the notification lists to the appropriate property managers (step 142) using e-mail or another appropriate method.

Figure 7:
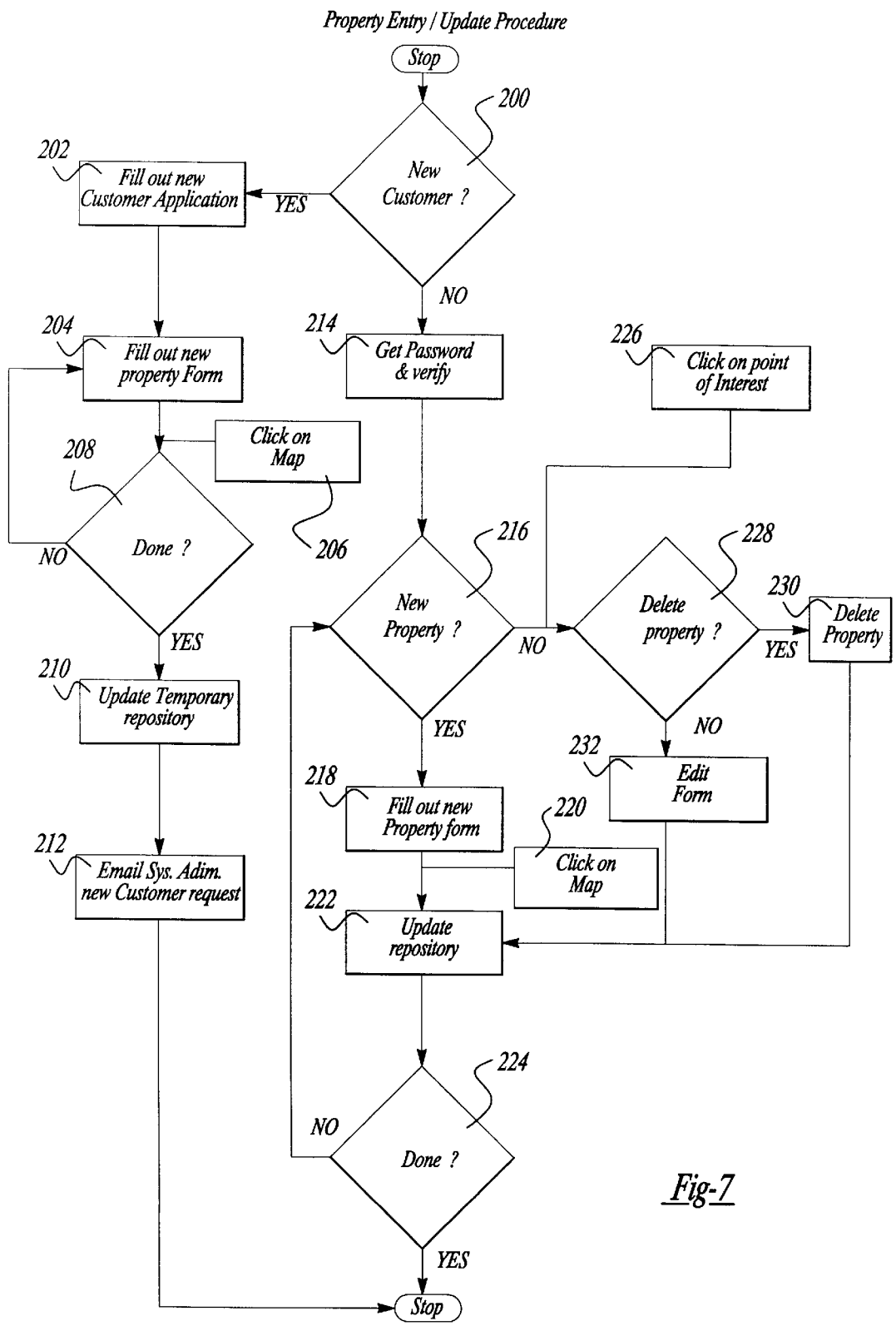
FIG. 7 is a schematic flow chart diagram showing a method of entering and/or updating database entries according to the present invention.
Figure 8:
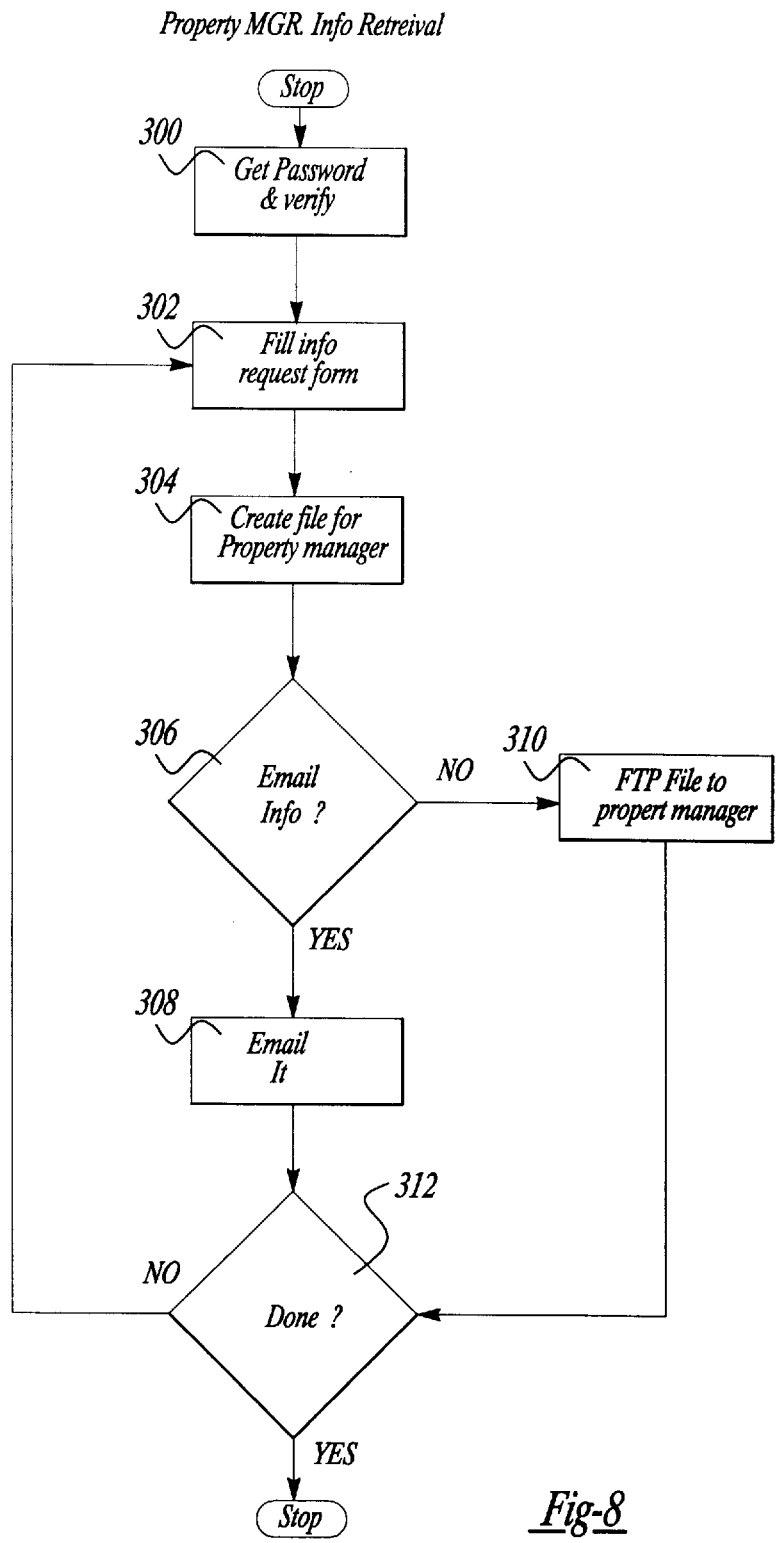
FIG. 8 is a schematic flow chart diagram showing a method of property manager information retrieval according to the present invention.

The system 12 is also configured so that lessors and property managers can easily establish and maintain listings in the database 22 for the users to access. FIGS. 7 and 8 illustrates the process for establishing and maintaining property listing in the database 22.

A property manager may enter and update property listing in the system 10 through accessing the home page 18 and selecting the appropriate menu item. Upon entering the property entry/update portion of the system 12, the system first checks to see if this property manager is a new customer 200.

If the property manager is a new customer, the system will display a new customer application form 202 which must be filled in by the property manager to set up an account for the property manager. Once the new customer application form has been filled out, the new property form will be displayed 204. The property manager may fill in the new property form with information relating to the property to be listed including size, number of bedrooms/bathrooms, cost and other amenities. After the new property form is completed, the system 10 displays a graphic map and the property manager is prompted to recursively select regions on the map narrowing the geographic region displayed to the appropriate quadrant where the property is located. The property manager then selects the exact location of the property on the quadrant map 206. After the location of the property has been selected, the system 10 asks the property manager if there are additional properties to list 208. If the property manager indicates that there are, the system loops back to step 204 and displays another new property form. If the property manager indicates that he is done entering properties, the system creates a temporary repository file 210 containing the new property entries and e-mails the temporary repository file to the system administrator 212 for review and approval. After the system administrator has approved the new customer, the new property listing are added to the database and points of interest indicating the new listings are added to the appropriate user quadrant map.

If the property manager is not a new customer, the system prompts the property manager for his login ID and password and verifies the password 214. After password verification, the property manager is asked if he wants to enter a new listing or update an existing listing 216. If the property manager wishes to enter a new listing, the system 10 displays the new property form 218 and the property manager is allowed to fill in the new property form with information relating to the property. After the new property form is completed, the system 10 displays a graphic map and the property manager is prompted to recursively select regions on the map narrowing the geographic region displayed to the appropriate quadrant where the property is located. The property manager then selects the exact location of the property on the quadrant map 220. The system 10 then enters the new property listing into the database and adds the corresponding point of interest indicating the new listing to the appropriate user quadrant map 222. The system 10 then asks the property manager if he is done adding/editing property listings 224. If the answer is yes, the system 10 exits the property entry/update procedure. If the answer is no, the system 10 loops back up to step 216.

If the property manager indicates at step 216 that he is not entering a new property listing, the system allows the property manager to select an existing point of interest by narrowing the geographic region to the appropriate quadrant where the property is located and selecting the point of interest 226. The system then asks the property manager is the selected point of interest should be deleted 228. If the answer is yes, the point of interest and corresponding database record are deleted 230 from the system 10, the repository is updated 222 and the system asks the property manager if he has completed his entry/update procedure. If the answer is no, the system 10 displays and edit form and allows the property manager to edit the database record corresponding to the selected point of interest 232. After editing, the system 10 updates the repository 222 and asks the property manager if he has completed his entry/update procedure 224.

The system 10 is also configured to notify property managers when a user has indicated an interest in one of the property manager's listed properties. The first step in establishing a property manager file involves entering and verifying the property manager's ID and password 300. After the ID and password have been verified, the property manager will be required to fill in an information request form 302 with information about the property manager. The system 10 will create a property manager file 304 containing any user inquiries for the property manager. The property manager will then be prompted to enter a return e-mail address. The system will check for the presence of this e-mail address 306. If an e-mail address is entered, the system will e-mail the user inquiries to the property manager 308. If an e-mail address is not entered, the system will send the file using File Transfer Protocol or another suitable method to the property manager 310. In either case, after the file is sent, the property manager is asked if he is done with information retrieval 312. If the answer is yes, the system 10 exits the information retrieval procedure. If the answer is no, the system 10 returns to step 302 and continues processing.

It is to be understood that the invention is not limited to the exact construction illustrated and described above, but that various changes and modifications may be made without departing from the spirit and scope of the invention as defined in the following claims.

We claim:

1. A method of presenting, searching, selecting and maintaining geographic specific housing information contained in a database and supplied by various property managers, the method comprising the steps of:

presenting a graphical map depicting a large initial geographic area, said graphical map being divided into smaller selectable geographic regions;

narrowing said initial geographic area by recursively selecting and successively displaying said smaller geographic regions using a graphical tree structure;

displaying a desired geographic region, said desired geographic region including individual highlighted points of interest corresponding to available housing;

recursively selecting highlighted points of interest and retrieving from the database information related to each selected point of interest; and compiling an interest list of interesting properties, including a list of interesting properties and user information for contacting a person interested in said interesting properties contained in said list.

2. A method according to claim 1 further comprising the steps of:

adding new listing information into said database by:

presenting a graphical map depicting a large initial geographic area, said graphical map being divided into smaller selectable geographic regions;

narrowing said initial geographic area by recursively selecting and displaying said smaller geographic regions;

displaying an enlarged view of a desired geographic region;

inserting a new point of interest into said desired geographic region by selecting a location on said displayed desired geographic region; and entering information into a database record corresponding to said new point of interest.

3. A method according to claim 1 further comprising the steps of:

editing existing database records by:

presenting a graphical map depicting a large initial geographic area, said graphical map being divided into smaller selectable geographic regions;

narrowing said initial geographic area by recursively selecting and displaying said smaller geographic regions;

displaying an enlarged view of a desired geographic region, said desired geographic region including highlighted points of interest corresponding to database records;

selecting a highlighted point of interest corresponding to a database record to be edited;

displaying and editing said database record corresponding to said highlighted point of interest.

4. A method according to claim 1 further comprising the steps of:

deleting existing database records by:

presenting a graphical map depicting a large initial geographic area, said graphical map being divided into smaller selectable geographic regions;

narrowing said initial geographic area by recursively selecting and displaying said smaller geographic regions;

displaying an enlarged view of a desired geographic region, said desired geographic region including highlighted points of interest corresponding to database records;

selecting a highlighted point of interest corresponding to a database record to be edited;

deleting said database record corresponding to said highlighted point of interest.

5. A method according to claim 1 further comprising the step of:

displaying a digitized picture of a property corresponding to a selected point of interest, each time said point of interest is selected.

6. A method according to claim 1 further comprising the step of:

displaying a full motion video clip of a property corresponding to a selected point of interest, each time said point of interest is selected.

7. A method according to claim 1 wherein the step of notifying further comprises the steps of:

compiling and sending an e-mail message to said property manager containing said user information and a list of all properties belonging to said property manager in said interest list.

8. A method according to claim 1 further comprising the steps of:

entering a search criteria prior to said step of displaying said enlarged view; and displaying said enlarged view of said desired geographic region, including only points of interest which meet said search criteria.

9. A method according to claim 1 further comprising the step of notifying a property manager of an interest in properties belonging to said property manager listed on said interest list.

10. A geographic-specific information search system, comprising:

a database for storing a plurality of database records of real estate listing data each record pertaining to a property and the location of that property as defined by coordinates on a predetermined map;

a set of map tables for storing information that identifies the image of a plurality of maps representing different predefined geographic boundaries and having predefined features located within said boundaries, said map tables further configured for storing coordinate data associated with said predefined features;

an input/output interface for communicating with a computer network and for communicating with a user interface for displaying maps and listing data and for receiving queries from a user, said queries including input coordinates entered by the user using a pointing device;

a query handler coupled to said input/output interface for using said set of map tables to decode said input coordinates and to access said set of map tables to retrieve information identifying one of said predetermined maps based on said input coordinates, said query handler further configured for receiving a user-entered query through said input/output interface and accessing said database to retrieve database records that satisfy the user-entered query;

a map compiler responsive to said query handler for constructing a query-specific map by placing query-specific properties within the boundary of said one of said predetermined maps, said query-specific properties corresponding to said retrieved database records and the placement of each query-specific property within said boundary being defined by coordinates according to said retrieved database records;

a table builder responsive to said query handler for building a query-specific map table for storing information that identifies the image of said query-specific map and that further identifies properties located within the boundary of said query-specific map and the location of each query-specific property as defined by coordinates on said query-specific map, said table builder adding said query-specific map to said set of map tables to define an augmented set of map tables;

whereby the user may view selected real estate listing data by selecting from said query-specific map one of said query-specific properties using a pointing device to enter coordinates for decoding by said query handler through access to said augmented set of map tables.

11. A system according to claim 10 wherein said input/output interface comprises an http deamon process configured for communicating with the World Wide Wed.

12. A system according to claim 11 wherein said http deamon process further includes a common gateway interface for receiving and forwarding said input coordinates.

13. A system according to claim 10 wherein said computer network comprises the World Wide Web.

14. A system according to claim 10 wherein said user interface comprises an Hyper Text Markup Language browser.

15. A system according to claim 10 further comprising:

a list builder for building and maintaining an interest list of designated selected properties said interest list including information identifying each designated property as well as information identifying a property manager in charge of managing said each designated property.

16. A system according to claim 15 further comprising:

an editor for editing said interest list and for adding user information to said interest list.

17. A system according to claim 15 further comprising:

an e-mail manager for compiling and sending an e-mail message to property managers having a property included on an interest list notifying said property manager of an interest in a property managed by said property manager.

18. A system according to claim 10 further comprising:

an editor for editing or deleting real estate listing data associated with selected properties.

19. A system according to claim 10 further comprising:

an editor for adding new properties to said database, said editor comprising a means for entering property information and a pointing device for entering the coordinates of said new properties on a predefined map image, wherein said property is contained within the boundaries of said predefined map image.

20. A system according to claim 10 said input/output interface, upon request from a user, is capable of downloading a digitized picture of a selected property to said user interface.

21. A system according to claim 10 said input/output interface, upon request from a user, is capable of downloading a full motion video of a selected property to said user interface.

22. A method of conducting a search of a database of geographic-specific housing information comprising the steps of:

displaying a graphical representation of an initial geographic region;

defining a first query including a specific geographic region by recursively selecting and displaying geographic subregions using a graphical tree structure thus defining said specific geographic region to desired geographic search area;

defining a second query including real estate listing information to form a desired property criteria;

searching the database for properties which meet said first and second queries;

creating a query-specific graphical representation of said desired geographic search area having features corresponding to properties found during said database search, wherein said features are displayed on said graphical representation in locations representing said properties locations within said geographic search area displaying said query-specific graphical representation;

selecting features from said query-specific graphical representation; and displaying geographic-specific housing information describing properties represented by said selected features.

23. A method according to claim 22 further comprising the steps of:

building a interest list of properties of interest;

notifying a property manager of an interest in a property managed by said property manager and included on said interest list.

* * * * *